United States Patent [19]

Jacot et al.

[11] Patent Number: 4,848,525
[45] Date of Patent: Jul. 18, 1989

[54] DUAL MODE VIBRATION ISOLATOR

[75] Inventors: A. Dean Jacot, Kent, Wash.; Brian J. Hamilton, Glendale, Ariz.; David C. Cunningham, Carefree, Ariz.; L. Porter Davis, Phoenix, Ariz.

[73] Assignee: The Boeing Company, Seattle, Wash.

[21] Appl. No.: 116,098

[22] Filed: Nov. 2, 1987

[51] Int. Cl.$^4$ ............................................. F16F 7/10
[52] U.S. Cl. ............................... 188/378; 188/267; 267/136; 248/550; 248/562; 248/636
[58] Field of Search ............... 188/378, 379, 380, 267; 267/140.1, 136, 141.1; 248/550, 558, 636, 639, 562, 638

[56] References Cited

U.S. PATENT DOCUMENTS

| | | | |
|---|---|---|---|
| 3,703,999 | 11/1972 | Forys et al. | 248/638 |
| 3,868,082 | 2/1975 | Soderqvist | 248/562 |
| 3,952,979 | 4/1976 | Hansen | 248/638 |
| 4,088,018 | 5/1978 | Anderson et al. | 73/178 R |
| 4,156,548 | 5/1979 | Anderson et al. | 308/10 |
| 4,314,623 | 2/1982 | Kurokawa | 188/379 X |
| 4,418,898 | 12/1983 | Atsumi et al. | 267/141.1 X |
| 4,432,441 | 2/1984 | Kurokawa | 188/379 X |
| 4,498,038 | 2/1985 | Malueg | 248/550 X |
| 4,550,812 | 11/1985 | Mard | 267/136 X |
| 4,573,592 | 3/1986 | Oliphant | 267/136 X |
| 4,624,435 | 11/1986 | Freudenberg | 248/550 |

FOREIGN PATENT DOCUMENTS 0796540  1/1981  U.S.S.R. ............... 188/380

OTHER PUBLICATIONS

Cunningham et al., Design of the Annular Suspension and Pointing Sytstem (ASPS), NASA Contractor Report 3343, Oct. 1980.
Dieudonne et al., An Actuator Extension Transformation for a Motion Simulator and an Inverse Transformation Applying Newton-Raphson's Method, NASA Technical Note D-7067, Nov. 1972.

Primary Examiner—Douglas C. Butler
Attorney, Agent, or Firm—John C. Hammar

[57] ABSTRACT

A dual mode vibration isolator for reducing transmission of vibrations between a forward body and an aft body includes a mounting member positioned between the forward and aft bodies, a plurality of magnetic actuators each having an armature fixed to the forward body and a stator mounted on the mounting member, and a plurality of linear actuators pivotally connected between the aft body and the mounting member. The magnetic actuators support the forward body relative to the mounting member by magnetically supporting the armatures between paired stator cores in each stator. The magnetic actuators are controlled, preferably through local flux feedback loops, to permit the stators to vibrate relative to the armature without transmitting forces to the armatures, thus isolating the vibration of the aft body and mounting member from the forward body. The linear actuators extend and contract to reposition the forward body and mounting member relative to the aft body. In addition, the linear actuators provide supplemental vibration isolation through a followup isolation loop that detects variation of the armatures from a predetermined null position between the paired stator cores. The followup isolation loop moves the mounting member relative to the aft body to restore the armatures to their null positions. The assistance provided by the linear actuators enables the use of small-size magnetic actuators for a given force requirement. A method for isolating vibration from transmission between two bodies also is disclosed.

55 Claims, 12 Drawing Sheets

4,848,525

DUAL MODE VIBRATION ISOLATOR

NOTICE OF GOVERNMENT RIGHTS

This invention was made with Government support under Contract No. F29601-85-C-0132 awarded by the Air Force. The Government has certain rights in this invention.

BACKGROUND OF THE INVENTION

1. Field of the Invention

This invention relates to an apparatus and method for reducing the transfer of vibrations between structures, that is, isolating vibration between structures. More particularly, this invention relates to an apparatus and method for reducing the transmission of vibrations between two bodies while permitting the bodies to be moved relative to one another.

2. Description of the Related Art

Many applications require that the vibrations from one body not affect another body, especially if both bodies are part of the same system. In an earth-orbiting laser system, for example, an aft body incorporating a laser cooperates with a forward body incorporating an optical projection apparatus. The laser system must be capable of (1) retargeting, that is, repositioning the forward body relative to the aft body to aim the laser at a desired target, and (2) providing quiescent tracking of the forward body relative to the aft body to maintain accurate aiming. Because of the large distance typically separating the laser from its target, very small vibratory displacements of the forward body will produce large displacements of the laser beam at the target. To maintain accuracy, vibrations must be isolated between the laser and the optical projection system during both quiescent tracking and retargeting.

In one system for isolating vibrations, disclosed in U.S. Pat. No. 3,952,979, two bodies are connected by six support members. Each support member has a central axis that intersects the central axes of two adjacent support members at right angles. Each support member also includes an accelerometer at the central axis and a coil to adjust the member's length. The accelerometers measure the respective axial components of vibrations being transferred between the bodies. These measurements are then sent to a feedback circuit that actuates the support members' coils to adjust each member's length and offset the component of the vibratory movement that corresponds to the axis of the support member. Because the bodies are mechanically connected, certain modes of vibration are transmitted between the two bodies.

Another system for vibration isolation uses magnetic actuators to support one body relative to another body by magnetic fields. Such a system is proposed by Cunningham et al. in NASA Contractor Report 3343, entitled *Design of the Annular Suspension and Pointing System* (ASPS) (October 1980), which is incorporated herein by reference. This system uses a plurality of magnetic actuators each having a stator connected to one body and an armature connected to the other body. The stator generates a magnetic field between a pair of spaced-apart stator cores, and the armature is suspended between the pole faces of the stator cores by the magnetic field. The magnetic fields can be adjusted to provide vibration isolation by reducing the transmission of forces between the stator and armature as one body moves relative to the other body. The magnetic actuators, however, must have very large gaps between the pole portions to permit large displacements of one body relative to the other during, for example, retargeting. Large gaps, in turn, dictate massive stators energized by large currents. The necessity for massive stators and large currents is a significant disadvantage, particularly on board earth-orbiting systems which require minimum payload weight and power consumption.

It is therefore one object of the present invention to provide a vibration isolator for efficiently reducing the transmission of vibrations between two bodies.

Another object of this invention is to provide vibration isolation between two bodies while providing for repositioning of the bodies relative to one another.

A further object of this invention is to provide a dual mode vibration isolator that permits the use of small-gap magnetic actuators of relatively low mass yet is capable of transmitting large forces while repositioning one body relative to the other.

Another object of this invention is to provide a method for isolating vibrations from transmission between a first and second body.

Additional objects and advantages of the present invention will be set forth in part in the description that follows and in part will be obvious from that description or can be learned by practice of the invention.

SUMMARY OF THE INVENTION

The present invention overcomes the problems of the prior art by positioning magnetic actuators between a first body and a mounting member to magnetically support the first body relative to the mounting member and by connecting linear actuators between a second body and the mounting member. The magnetic actuators reduce the transmission of high-frequency vibrations between the two bodies, while the linear actuators permit large-displacement repositioning of one body relative to the other body and supplement the isolation of vibrations between the two bodies. The use of linear actuators for repositioning permits the use of small-gap magnetic actuators.

More generally, a dual mode vibration isolator comprises a mounting member positioned between a first body and a second body, first isolation means mounted on the mounting member between the first body and the mounting member for reducing the transmission of vibrations between the first and second bodies, and second isolating means mounted on the mounting member between the second body and the mounting member for reducing the transmission of vibrations between the first and second bodies. Preferably, the second isolating means also provides means for repositioning the mounting member and first body relative to the second body.

More specifically, the vibration isolating apparatus of this invention comprises a mounting member positioned between first and second bodies, means for magnetically supporting the first body relative to the mounting member, and actuator means connected between the second body and the mounting member operative when activated to move the mounting member relative to the second body. The magnetic support means includes gap sensor means for detecting variation of the mounting member from a prescribed position relative to the second body, and the apparatus of this invention further comprises system control means responsive to the gap sensor means for activating the actuator means to move the mounting member to the prescribed position relative to the first body.

In a preferred embodiment, the mounting member is triangular in shape and includes three mounting pads equally spaced from each other. The magnetic support means preferably includes three pairs of magnetic actuators each having an armature fixed to the first body and a stator fixed to a mounting pad of the mounting member, with each pair of magnetic actuators being mounted on one mounting pad. Each of the stators includes a pair of spaced-apart stator cores having wound thereon a pair of magnetic coils generating oppositely directed magnetic fields therebetween. Each of the armatures is suspended between the stator cores of the corresponding stator by the magnetic fields. The actuator means preferably includes three pairs of linear actuators each having one end pivotally connected to the second body and another end pivotally connected to a mounting pad of the mounting member with each pair of linear actuators being pivotally connected to one of the mounting pads. Each of the linear actuators includes positioning means operative when activated to selectively vary the length of the individual linear actuator and move the mounting member relative to the second body. Preferably, the paired magnetic actuators and linear actuators are substantially aligned.

Local control means for adjusting the magnetic fields of each of the magnetic actuator stators permits the stator to vibrate relative to the corresponding armature without transmitting vibration to the corresponding armature. The local control means generally includes a flux feedback loop operating at a first bandwidth in response to flux sensors mounted on each stator. The system control means preferably includes a followup isolation loop operating through the gap sensor means at a second bandwidth lower than the first bandwidth. The gap sensor means measures the displacement between each armature and stator.

The accompanying drawings, which are incorporated in and which constitute a part of this specification, illustrate at least one embodiment of the invention and, together with the description, explain the principles of the invention.

DESCRIPTION OF THE PREFERRED EMBODIMENTS

Figure 1:
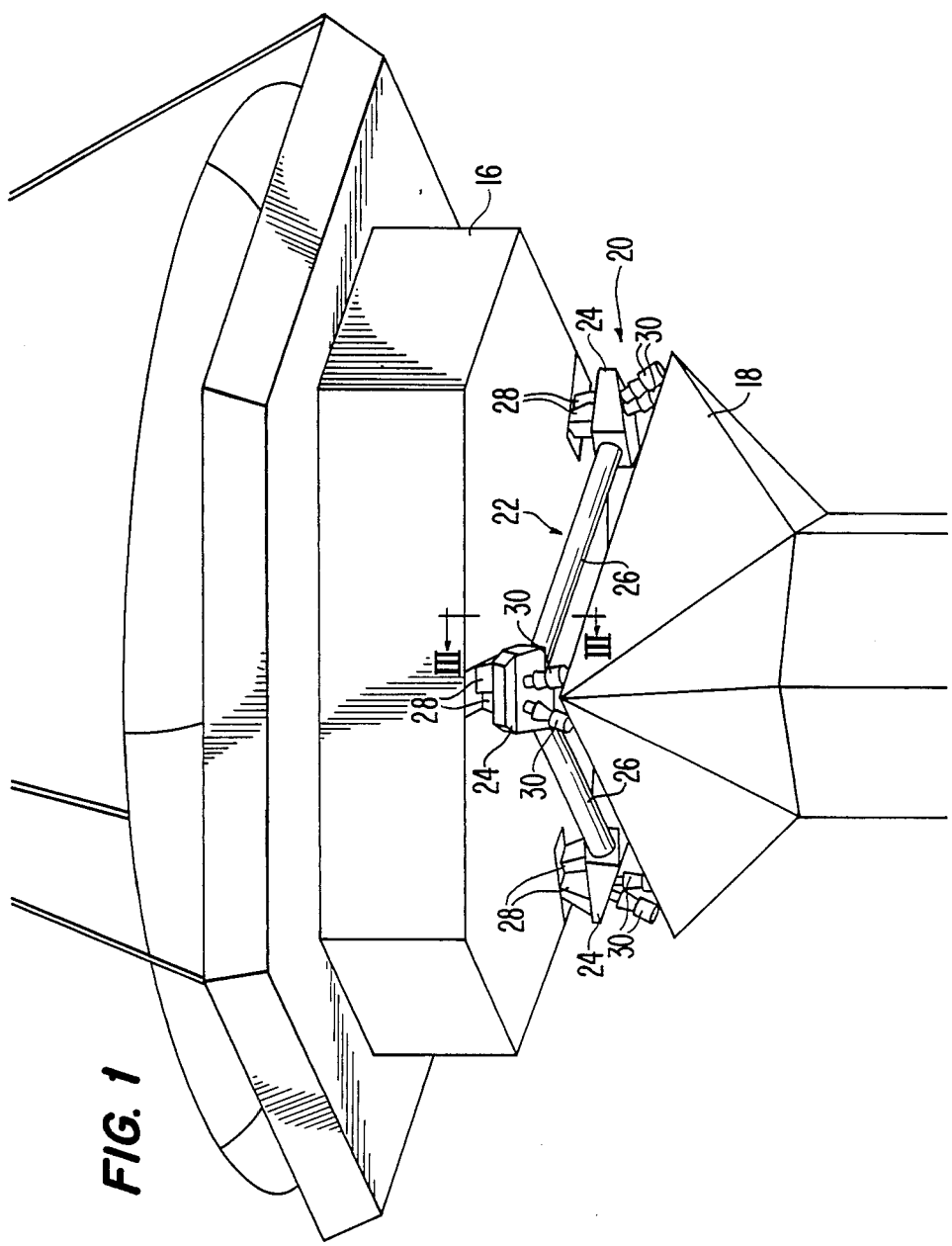
FIG. 1 is a partially schematic perspective view of one embodiment of the dual mode vibration isolator of this invention as used in an earth-orbiting laser system.

Reference now will be made in detail to a presently preferred embodiment of the invention, examples of which are illustrated in the accompanying drawings.

The invention will be described with reference to a spare active vibration isolator (SAVI) system used with an earth-orbiting laser. The presently preferred embodiment of such a system is shown generally in FIG. 1, where a forward body 16 is suspended relative to an aft body 18 by a vibration isolator designated generally by reference numeral 20. In the embodiment shown in FIG. 1, aft body 18 includes a laser generating device (not shown) and forward body 16 includes an optical projection apparatus (not shown) for projecting the laser beam generated in aft body 18 onto a desired target.

Vibration isolator 20 functions both to retarget the laser beam by repositioning forward body 16 relative to aft body 18 and to reduce the transmission of vibratory movement from aft body 18 to forward body 16 during retargeting and during quiescent tracking. Vibration isolator 20 also isolates from aft body 18 vibrations originating with forward body 16. The isolator 20 is intended to apply a torque of up to 17,000 N-m for pivoting forward body 16, which has a mass of about 6000 kg, through an arc of approximately 4° centered at a point on the top surface of aft body 18 ($\pm 2°$ from a neutral position in which forward body 16, mounting member 20, and aft body 18 all are aligned along a single longitudinal axis), as well as to provide about $-80$ dB isolation of vibrations within a frequency range of 1-2000 Hz.

To meet these goals and in accordance with the invention, vibration isolator 20 includes mounting member 22, disposed between forward body 16 and aft body 18, and first and second vibration isolation means mounted on mounting member 22 for reducing the transmission of vibration between forward body 16 and aft body 18. Vibration isolator 20 is referred to as a "dual mode" isolator because it includes two distinct but interdependent isolation systems embodied in the first and second vibration isolation means. Mounting member 22 provides a stable mechanical interface between the first and second vibration means.

Figure 2:
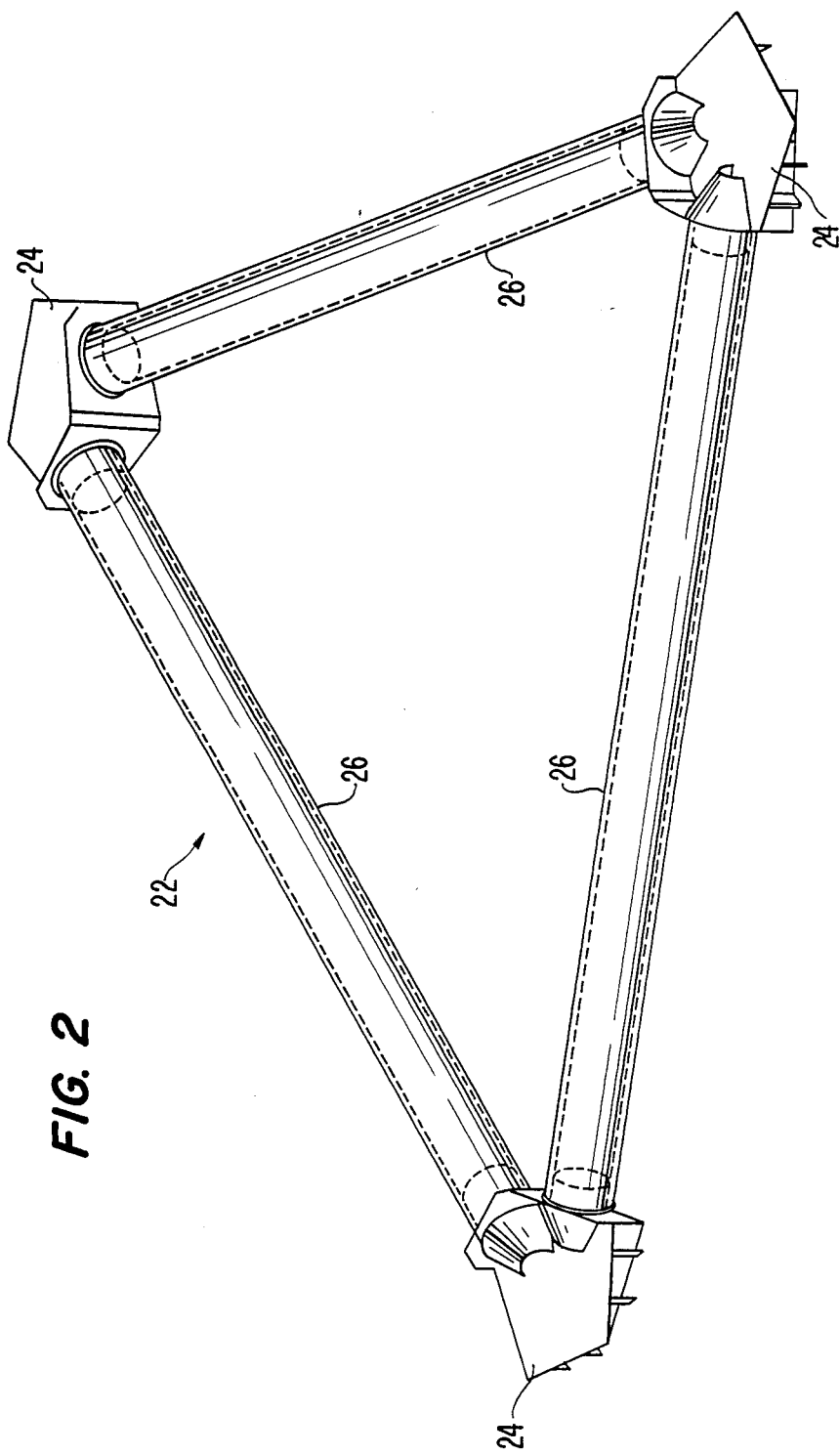
FIG. 2 is a perspective view of the mounting member of the embodiment of the invention shown in FIG. 1.

With reference to FIG. 2, mounting member 22 preferably is triangular in shape and includes three mounting pads 24 connected by equal-length tubular connectors 26. Preferably, mounting pads 24 are comprised of aluminum and tubular connectors 26 are comprised of graphite fiber and epoxy. Of course, alternative configurations, such as a ring-shaped platform, can be used for mounting member 22. Tubular connectors 26, however, economically provide high dimensional stability and structural stiffness with relatively low weight penalties.

With reference to the embodiment shown in FIG. 1, the first vibration isolation means of this invention includes three pairs of magnetic actuators 28. Each pair of magnetic actuators is mounted between forward body 16 and one of the mounting pads 24 of mounting member 22. Magnetic actuators 28 provide means for magnetically supporting forward body 16 relative to mounting member 22 and provide the primary vibration isolation between forward body 16 and aft body 18.

The second vibration isolation means of this invention includes three pairs of linear actuators 30. Each pair of linear actuators is mounted between aft body 18 and one of the mounting pads 24 of mounting member 22. The lengths of linear actuators 30 are adjustable to provide means for repositioning mounting member 22 relative to aft body 18 during retargeting and to provide secondary vibration isolation.

Figure 3:
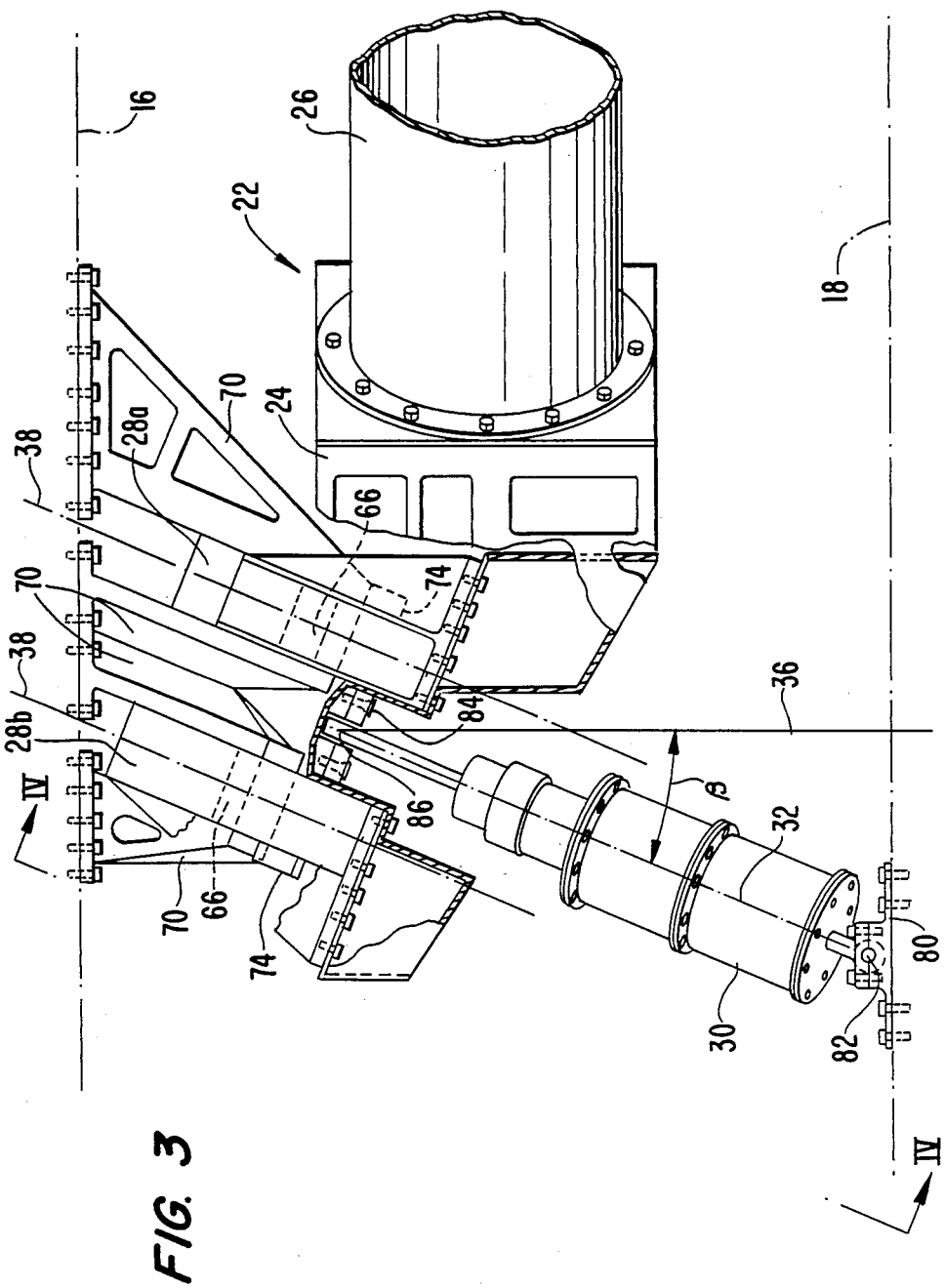
FIG. 3 is a side elevational view of a typical interconnection between magnetic actuators and linear actuators at a mounting pad position at a vertex of the mounting member in the embodiment of the invention shown in FIG. 1.
Figure 4:
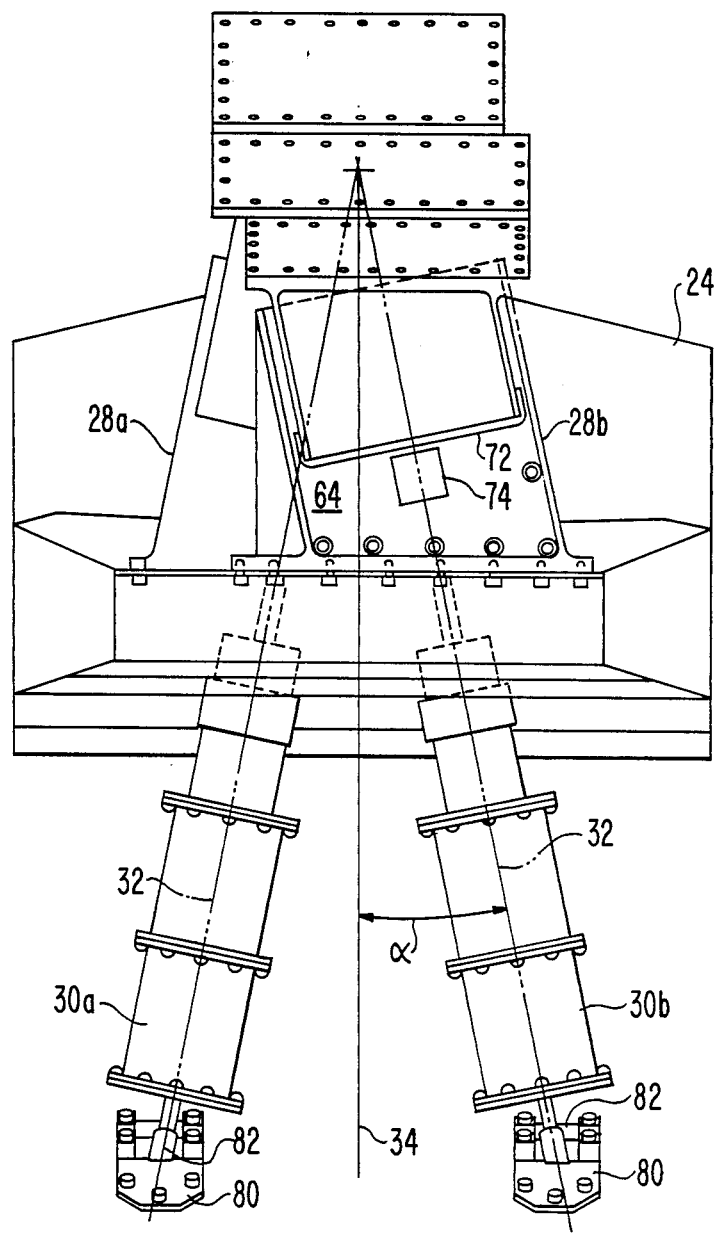
FIG. 4 is a canted side view taken generally along line IV—IV of FIG. 3.

FIGS. 3 and 4 are elevational views showing the relative orientation of the paired magnetic actuators 28 and linear actuators 30 at each mounting pad 24. In FIGS. 3 and 4, the left- and right-hand linear actuators (as seen in FIG. 4) are designated respectively by reference numerals 30a and 30b, and the two magnetic actuators are designated by reference numerals 28a and 28b. Each linear actuator has a longitudinal axis 32 forming an angle $\alpha$ with respect to a line 34 coplanar with and bisecting the angle between the two axes 32. As seen in FIG. 3, the plane containing axes 32 of linear actuators 30 (only linear actuator 30b is shown) forms an angle $\beta$ with respect to a vertical line 36. For the forward body requirements of the particular SAVI apparatus shown in FIGS. 1-4, $\alpha$ preferably is about 11.9° and $\beta$ preferably is about 22°. These angles were chosen to reduce the forces that must be exerted by linear actuators 30 during retargeting. The preferred orientation of linear actuators 30 minimizes the angles between axes 32 and the direction of movement of mounting member 22 as forward body 16 is pivoted through the desired arc. As will be apparent to one of ordinary skill in the art, linear actuators 30 can be arranged in other embodiments to provide repositioning of mounting member 22 and forward body 16 through an arc greater than 4°, if desired, and to define the vertex of the desired arc at any desired point.

Figure 5:
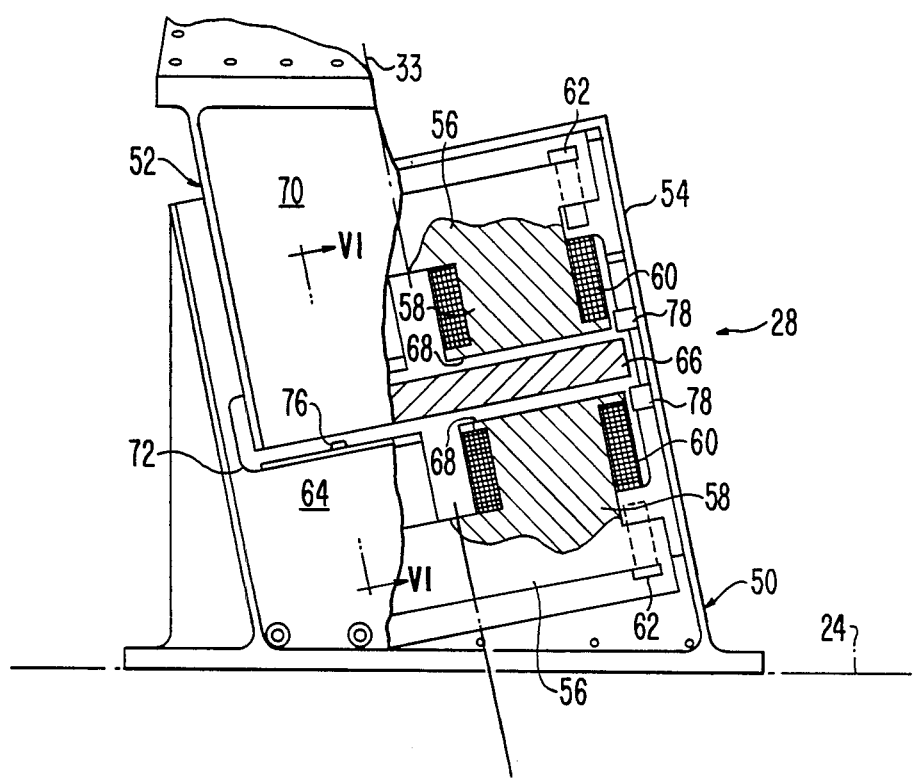
FIG. 5 is a partial cross-sectional view of one of the magnetic actuators of the embodiment of the invention shown in FIG. 1.
Figure 6:
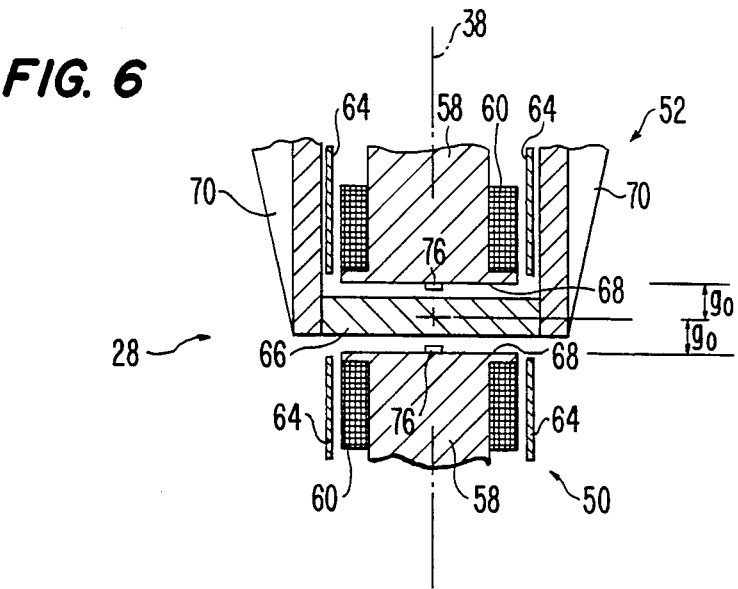
FIG. 6 is a partial cross-sectional view taken generally along line VI—VI of FIG. 5.

Each magnetic actuator 28 includes a stator 50 preferably fixed to a mounting pad 24 and an armature assembly 52 preferably fixed to forward body 16. Stator 50 and armature assembly 52 are movable relative to each other in a given direction in response to magnetic fields generated by the stator. The direction of movement of each stator 50 relative to its corresponding armature assembly 52 is along line 38, which as shown in FIGS. 5 and 6 is parallel to the axes about which the magnetic coils 60 of stator 50 are wound. In the embodiment of the invention shown in FIGS. 1-6, lines 38 for magnetic actuators 28a and 28b are parallel to and closely spaced from axes 32 of linear actuators 30a and 30b, respectively.

Setting the lines of action of the magnetic actuators and linear actuators approximately coincident simplifies control of isolation 20 in several respects. As the mass of mounting member 22 is substantially less than that of forward body 16, the force generated by each aligned magnetic actuator and linear actuator are substantially equal during retargeting. This preferred configuration also minimizes the forces and moments on mounting member 22, which in turn reduces its deflection and the resulting errors. For the same reasons that apply to the preferred orientation of linear actuators 30, the preferred orientation of magnetic actuators 28 minimizes the forces that must be exerted by magnetic actuators 28 during retargeting, thus minimizing the size, weight, and power consumption of the magnetic actuators.

FIGS. 5 and 6 are partial cross-sectional views of one magnetic actuator 28, specifically right-hand magnetic actuator 28b as seen in FIG. 4. Left-hand magnetic actuator 28a is essentially a mirror-image of magnetic actuator 28b. As stated above, each magnetic actuator 28 includes a stator 50 fixed to one of mounting pads 24 and an armature assembly 52 fixed to forward body 16. Mounting stators 50 on mounting member 22 rather than on forward body 16 in the SAVI system eliminates the necessity of running cables between mounting member 22 and forward body 16 to power the magnetic coils of stator 50 and thus eliminates an unwanted mechanical linkage between mounting member 22 and forward body 16. In addition, by having stators 50 mounted on mounting pads 24 of mounting member 22, the preferred embodiment of the invention employs the highly heat conductive aluminum mounting pads 24 as thermal heat sinks for the magnetic coils of stators 50, thus reducing the amount of heat radiated from the coils to forward body 16. If desired, of course, the orientation of the stator and armature assemblies can be reversed.

As shown in detail in FIG. 5, each stator 50 includes a frame member 54 for holding a pair of opposed horseshoe-shaped stator cores 56 each having magnetic coils 60 wound around its legs 58. In the embodiment shown in FIG. 5, stator cores 56 are fixed to frame 54 by screws 62. Each stator 50 also includes a pair of cover plates 64 fixed to frame 54.

Armature assembly 52 of each magnetic actuator 28 includes an armature 66 disposed between the opposed pole faces 68 of stator core legs 58. Armature 66 is connected to forward body 16 by mounting legs 70. Cover plates 64 of stator 50 include slots 72 to permit stator 66 to pass between opposed stator cores 56.

To minimize the mass of stators 50, stator cores 56 and armature 66 preferably are comprised of vanadium permendur. Stator cores 56 and armatures 66 can be comprised of other magnetic materials, for example, nickle-iron alloys or soft iron, but equal-mass stator cores and armatures of vanadium permendur can operate at higher flux levels before saturation. Preferably, the remaining components of the magnetic actuators are comprised of non-magnetic material, such as aluminum, to prevent these components from disturbing the magnetic circuit defined by the stator cores and armature. In the preferred embodiment of the invention as applied to the SAVI system, the stator of each magnetic actuator 28 must be able to generate a force of up to about 3200 N on its corresponding armature during retargeting.

In FIGS. 5 and 6 armature 66 of each magnetic actuator 28 is positioned equidistantly from pole faces 68 of the opposed stator cores 56. This is referred to as the "null position." In the null position, the center of armature 66 is spaced from each of the opposed pole faces 68 by the nominal gap, g0 (see FIG. 6). When armature 66 is in the null position, the currents in field coils 60 of the opposed stator cores 56 are set equal to each other so that armature 66 is magnetically suspended in the null position by equal and opposite attractive magnetic forces. To isolate vibration, for example, to restrict the transmission of vibration from aft body 18 to forward body 16, the currents flowing through field coils 60 of the opposed stator cores 56 must be adjusted to permit mounting member 22 and stators 50 to move in response to vibrations generated in aft body 18 without transmitting forces to armatures 66 in order to avoid inducing vibratory movement in forward body 16.

As is well known in the art, when a closed loop conductor moves in a magnetic field generated by an electromagnet, the current producing the magnetic field will automatically change in accordance with Lenz's law to adjust the magnetic field so as to oppose movement of the conductor. Therefore, in the absence of any coil current adjusting system, the magnetic fields generated by coils 60 would tend to restrict movement of armature 66 from the null position and, consequently, would transfer vibration generated by aft body 18 to forward body 16.

To isolate rather than transfer vibrations, the present invention includes control means for adjusting the magnetic fields generated by stators 50 and for adjusting the lengths of linear actuators 30 in response to detected vibratory movement of mounting member 22 relative to forward body 16 so that the transmission of vibratory movement between the stator and armature is reduced. To assist in accomplishing vibration isolation, each magnetic actuator 28 includes means for sensing movement of the armature relative to the stator. As embodied herein, the sensing means of this invention includes gap sensors 74, one of which is mounted on each stator 50 adjacent armature 66. As seen in FIGS. 3 and 4, gap sensors 74 preferably are mounted on stator cover plates 64 adjacent holes 72. Gap sensor 74 measures the position of armature 66 relative to stator 50 along line 38 and preferably is an inductive transducer. Further in accordance with this invention, the sensor means includes temperature-compensated flux sensors 76 mounted on two opposed pole faces 68 of each stator 50. Flux sensors 76 sense the change in magnetic flux in response to movement of armatures 66 within the magnetic field generated by stator 50 in accordance with Lenz's law.

In the preferred embodiment of the invention as applied to the SAVI system, the clearance between armature 66 and each of the opposed pole faces is about 4.5 mm when armature 66 is in the null position. Under normal conditions, the control means of this invention will limit the relative movement of stators 50 and armature assemblies 52 to prevent armature 66 from varying more than about ±2.5 mm from the null position. To prevent armature 66 from contacting pole faces 68 of stator 50 and from damaging flux sensors 76 under abnormal conditions or upon failure of the control means, each stator 50 is provided with lugs 78, which are mounted on stator frame 54 and engage armature 66 before the armature can contact a pole face 68 or flux sensor 76. Lugs 78 preferably limit movement of armature 66 to about ±3.3 mm from the null position.

A description now will be given of the construction and operation of linear actuators 30. As shown in FIGS. 3 and 4, each linear actuator 30 has one end fixed to aft body 18 through aft mounting bracket 80 and a spherical bearing 82. The other end of each linear actuator 30 is mounted on a mounting pad 24 through forward mounting bracket 84 and spherical bearing 86 (see FIG. 3). Other pivot mechanisms, such as flexure universal joints, can be used to connect the ends of linear actuators 30 to aft body 18 and mounting pad 24.

The lengths of linear actuators 30 can be adjusted to reposition mounting member 22 and forward body 16 relative to aft body 18 during retargeting. Use of linear actuators as the repositioning means permits the use of much smaller and lighter magnetic actuators than if repositioning was accomplished by the magnetic actuators. In addition, linear actuators 30 provide second vibration isolation means that supplements vibration isolation by magnetic actuators 28.

Figure 7:
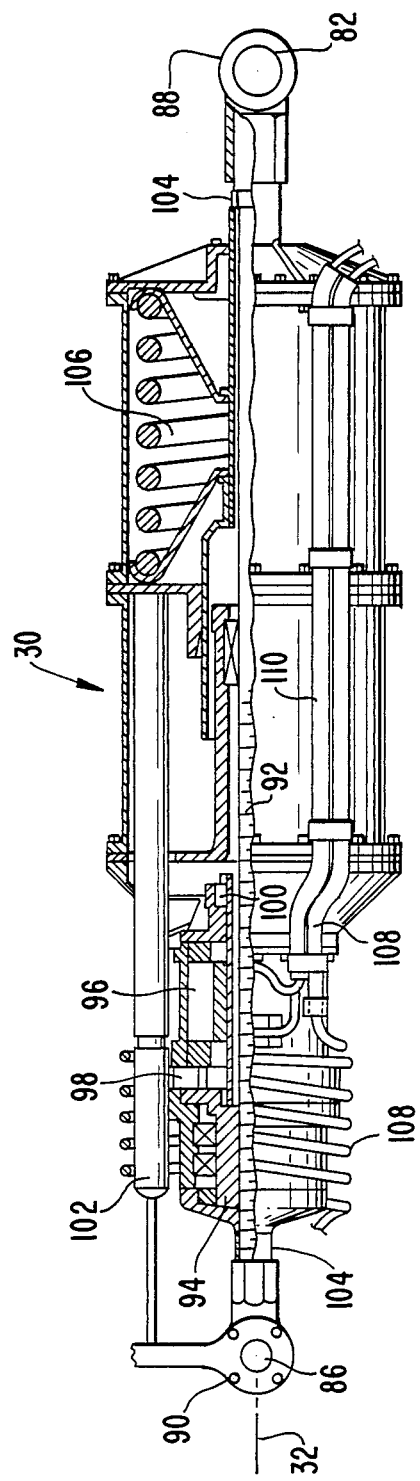
FIG. 7 is a partial cross-sectional view of one of the linear actuators of of the present invention shown in FIG. 1.

The presently preferred embodiment of linear actuator 30 of the present invention is shown in detail in FIG. 7. Each linear actuator 30 has a first end 88 which includes spherical bearing 82 for mounting to aft mounting bracket 80 and second end 90 which includes spherical bearing 86 for mounting to forward mounting bracket 84. Each linear actuator 30 also includes positioning means for selectively varying the length of the individual linear actuator to permit movement of the mounting member 22 relative to aft body 18. As embodied herein, the positioning means of linear actuator 30 includes roller screw shaft 92, which is fixed to second end 90, roller nut 94, and motor 96, which preferably is a brushless DC motor. Roller nut 94 is threadably engaged with roller screw shaft 92 and is rotatably connected to motor 96 through planetary gear set 98. Rotation of roller nut 94 in response to rotation of motor 96 causes roller screw shaft 92 and second end 90 to move linearly along axis 32 relative to first end 88 and either lengthen or shorten linear actuator 30. Extension and retraction of linear actuator 30 preferably is accomplished by rotating motor 96 in forward and reverse directions. To assist in controlling operation of linear actuators 30, each linear actuator includes tachometer 100 for measuring the rotational speed of roller screw shaft 92 and actuator length sensor 102 for measuring the length of actuator 30.

Preferably, each linear actuator 30 also includes rotational absorbing mechanisms 104 and a force limiting spring 106. Rotational energy absorbing mechanisms 104 preferably are adjacent each end of linear acuator 30. Mechanisms 104 limit the damage to linear actuator 30 in the event that motor 96 attempts to shorten or lengthen linear actuator 30 beyond its intended limits by absorbing the rotational energy of motor 96, gear set 98, roller nut 94, and tachometer 100. Force limiting spring 106 deflects when linear actuator 30 is subjected to a large compressive or tensile force, for example, if forward body 16 moves in an uncontrolled manner, thus limiting the forces applied to the rest of the linear actuator. In the preferred embodiment of the invention as applied to the SAVI system, each linear actuator 30 must be able to generate a force of up to about 4000 N during retargeting.

Linear actuator 30 also serves as a guide for magnetic actuator cables 108. As seen in FIG. 7, the excess length of magnetic actuator cable 108 is coiled around a portion of linear actuator 30 and uncoils as linear actuator 30 elongates. Reference numeral 110 denotes the cable containing the wires powering motor 96 of linear actuator 30.

The system and method of controlling vibration isolation and retargeting now will be described with reference to FIGS. 8-10.

Figure 8:
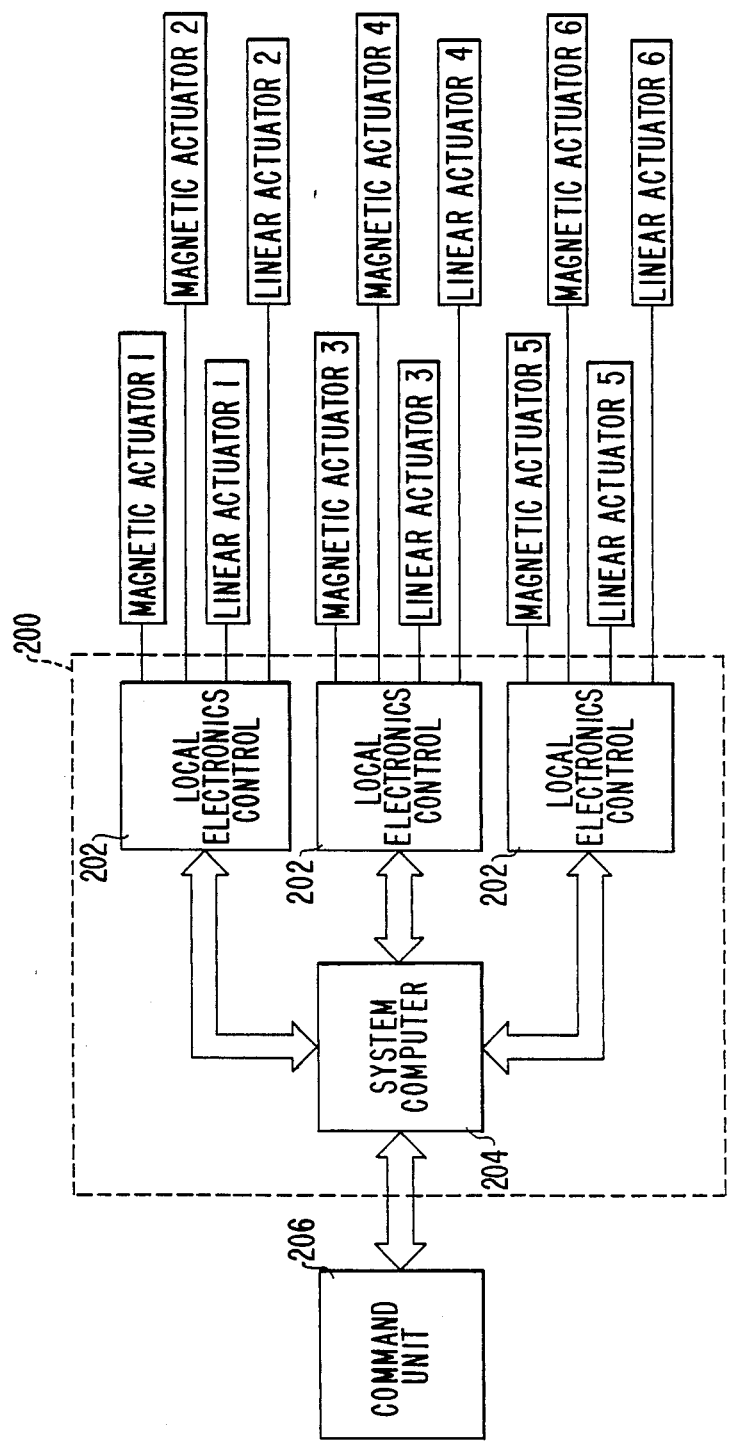
FIG. 8 is a block diagram of the control system of the present invention.

As embodied herein, the control means of this invention for controlling magnetic actuators 28 and linear actuators 30 to isolate vibration and retarget forward body 16 includes a controller, designated generally by reference numeral 200 in FIG. 8. Controller 200 includes local electronic control systems 202 for controlling the operation of each pair of magnetic actuators 28 and linear actuators 30 positioned at each mounting pad 24. Local electronics control systems 202 in turn are controlled by system computer 204, which interfaces with command unit 206. Retargeting commands are originated in command unit 206.

Figure 9:
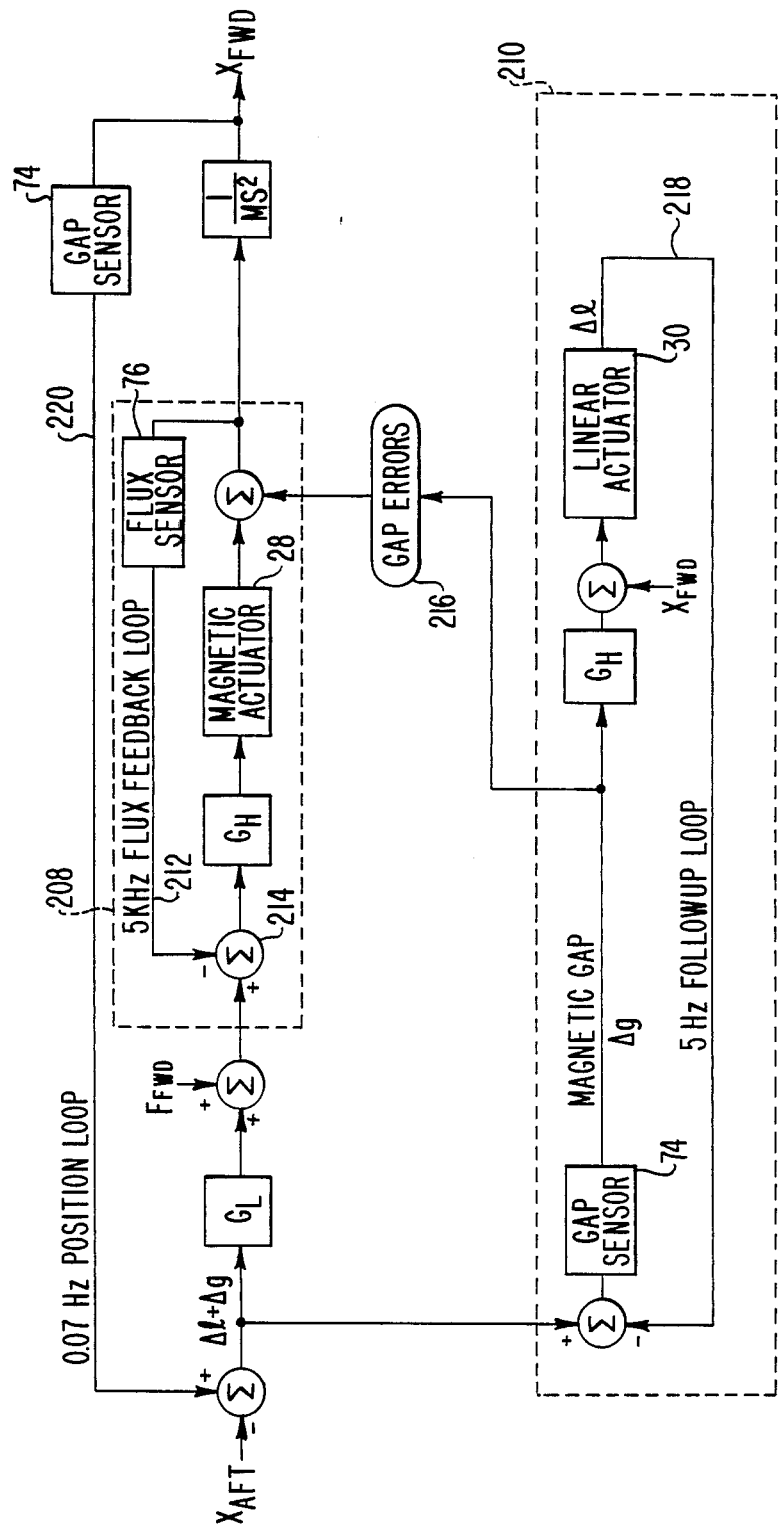
FIG. 9 is a block diagram of the control system of the present invention showing operation in one direction of motion.

A block diagram of the system of the present invention for controlling vibration isolation is shown in FIG. 9 with respect to a single magnetic actuator 28 and a single linear actuator 30 for one typical degree of freedom. Block 208 represents magnetic actuator 28 and the local electronics control system corresponding thereto. Block 210 represents linear actuator 30 and its corresponding local electronics control system.

During quiescent tracking, that is, in the absence of a commanded retargeting force, armature 66 of each magnetic actuator 28 is in the null position equidistant between the opposed pole faces 68 of stator cores 56 (see FIGS. 5 and 6). Under ideal conditions in an earth-orbiting position, no magnetic fields would need to be generated by magnetic coils 60 to maintain armatures 66 in the null position. In practice, however, low-level current is applied to magnetic coils 60 of opposed stator cores 56 to produce substantially equal attracting magnetic fields to ensure that armatures 66 remains in the null position. Of course, in an earth-bound application of the invention, the influence of gravity would require that substantial currents be applied to coils 60 to suspend armatures 66 in the null position.

By eliminating any mechanical connection between forward body 16 and mounting member 22, magnetic actuators 28 provide a degree of inherent vibration isolation between forward body 16 and aft body 18. As seen in FIG. 9, vibration isolation through the magnetic actuator 28 preferably is enhanced through a high frequency (approximately 5000 Hz) feedback loop 212 operating through flux sensor 76. In the single degree of freedom model shown in FIG. 9, vibratory movement generated, for example, in aft body 16 is transmitted through linear actuator 30 and its mounting pad 24 to cause stator 50 of magnetic actuator 38 to vibrate relative its corresponding armature 66. To isolate this vibration, that is, to prevent stator 50 from transmitting a force to armature 66 that would tend to induce vibratory movement in forward body 18, the flux change induced in the magnetic fields under Lenz's law in response to movement of armature 66 from the null position is sensed by flux sensor 76 and fed back as a negative value into summation operator 214. High frequency feedback loop 212 adjusts the coil currents of magnetic condutor 28 to negate the change in flux and thus permit vibratory movement of stator 50 relative to armature 66 without transmitting forces to armature 66. The block labeled $G_m$ in FIG. 9 represents the servo compensator for the magnetic actuator in the flux feedback loop, which stablizes operation of the magnetic actuator by varying gain with frequency.

Under commanded retargeting of forward body 16, a command force $F_{FWD}$ is transmitted from command unit 206 to magnetic actuator 28 through system computer 204. At the same time, linear actuator 30 is commanded to change its length by $X_{FWD}$, the desired displacement of forward body 16. In FIG. 9, $X_{FWD}$ is obtained by the operator labelled $1/(MS^2)$, where M is the mass of forward body 16 and $1/S$ is an integrating Laplace operator. During repositioning, flux feedback loop 212 continues to operate at a 5000 Hz bandwidth to reduce the transmission of vibration to forward body 16. In the preferred six degrees of freedom embodiment, the flux feedback loops 212 are local to each magnetic actuator 28 and are controlled by local electronics control systems 202.

In actual practice, magnetic actuator system 208 is subject to errors due to transient response effects and variations in field geometry when armature 66 varies from the null position. These errors, designated in FIG. 9 as gap errors 216, increase as the commanded retargeting force increases and as the displacement of armature 66 from the null position increases. Furthermore, as the magnetic actuators of the present invention preferably have small gaps (lugs 78 limit the maximum possible displacement of armature 66 relative to stator 50 to about ±3.3 mm from the null position), large displacement vibrations cannot be isolated effectively by magnetic actuator 28 alone.

To limit the effect of errors 214 and to isolate larger-displacement vibrations, the control system of the present invention as depicted in FIG. 9 is provided with a followup isolation loop 218, which deflects linear actuator 30 in response to gap sensor 74 of the corresponding stator 50 measuring a variation in the position of armature 66 from the null position. This variation from the null position is referred to herein as "gap motion" and is shown in the drawings by $\Delta g$. Followup isolation loop 218 preferably operates at about a 5 Hz bandwidth, well within the frequency response of linear actuators 30, which preferably is about 30 Hz. The block labeled $G_h$ in FIG. 9 represents the servo compensator for the linear actuator in the followup isolation loop. Followup isolation loop 218 extends or contracts linear actuator 30 by a distance equal to the detected gap motion in order to restore armature 66 to the null position, that is, followup loop 218 supplies a 5 Hz bandwidth check on the operation of magnetic actuators 28 by trying to drive $\Delta g$ to zero. Under anticipated loading conditions in the SAVI system, followup isolation loop 218 will limit $\Delta g$ to about ±2.5 mm.

As shown in FIG. 9, the control system of the present invention includes a low-bandwidth position loop 220, which operates through servo compensator $G_l$ at about a 0.07 Hz bandwith. Position loop 220 guards against drift errors in magnetic actuator 28 with a low-bandwidth adjustment of the coil currents of magnetic actuator 28 in response to a non-zero $\Delta g$ that returns armature 66 to the null position. The sum of $\Delta l$ and $\Delta g$ defines the relative movement of forward body 16 and aft body 18, $\Delta l$ being measured by actuator length sensor 102 (see FIG. 7).

Figure 10:
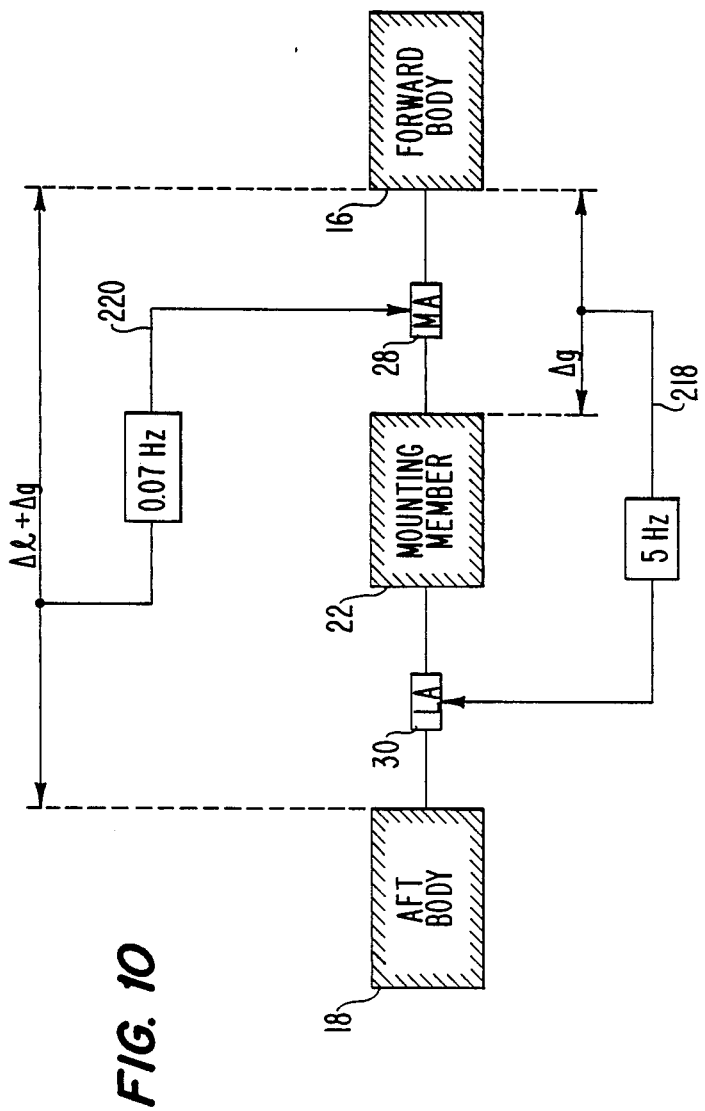
FIG. 10 is a block diagram showing the relationship between the followup loop and position loop in the control system of the present invention.

FIG. 10 is a schematic diagram showing the relationship of followup loop 218 and position loop 220 with respect to forward body 16, aft body 18, mounting member 22, magnetic actuators 28, and linear actuators 30.

In actual practice, control system 200 controls a system of six magnetic actuators and a system of six linear actuators with each system of actuators moving with six degrees of freedom. To accomplish control in six degrees of freedom, system computer 204 must be able to make transformations of six-by-six matrices defining the displacement, velocity, and acceleration of forward body 16, mounting member 22, and aft body 18 in terms of several coordinate systems, including those defined in terms of linear actuator lengths, magnetic actuator gap travel, and rotation about the desired pivot point. The computations are facilitated, of course, by the connection of all magnetic actuators 28 and linear actuators 30 to mounting member 22, which couples together the movement of all of the actuators within each system and couples the two actuator systems to each other. System computer 204 includes means for measuring time so that velocity and acceleration can be determined.

When the apparatus of the invention is operating in a six-degrees-of-freedom mode, control system 200 converts the six values of detected gap motions $\Delta g$ into measurements of the distance and angular orientation between forward body 16 and mounting member 20. Because of the small magnitude of gap motion $\Delta g$ in each magnetic actuator 28, small angle approximations can be used to simplify this transformation. Determining how the lengths of linear actuators 30 (known values by virtue of length sensors 102) should be adjusted to restore mounting member 20 to a position that reduces the values of $\Delta g$ to zero, however, requires an algorithm capable of relating the angular orientation and position of mounting member 20 to the lengths of the six linear actuators 30. An example of such an algorithm is disclosed in Dieudonne et al., *An Actuator Extension Transformation for a Motion Simulator and an Inverse Transformation Applying Newton-Raphson's Method*, NASA Technical Note D-7067 (November 1972), which is incorporated herein by reference. This algorithm uses an iterative numerical method known as the Newton-Raphson method to produce a solution, not necessarily the sole solution, determining values of $\Delta l$ that will restore mounting member 20 to an orientation that places armatures 66 in their null positions relative to stators 50. Of course, other algorithms can be used.

A second embodiment of the present invention now will be described with reference to FIGS. 11–15, in which elements previously described with respect to the first embodiment are represented by the same reference numerals as in FIGS. 1–7.

Figure 11:
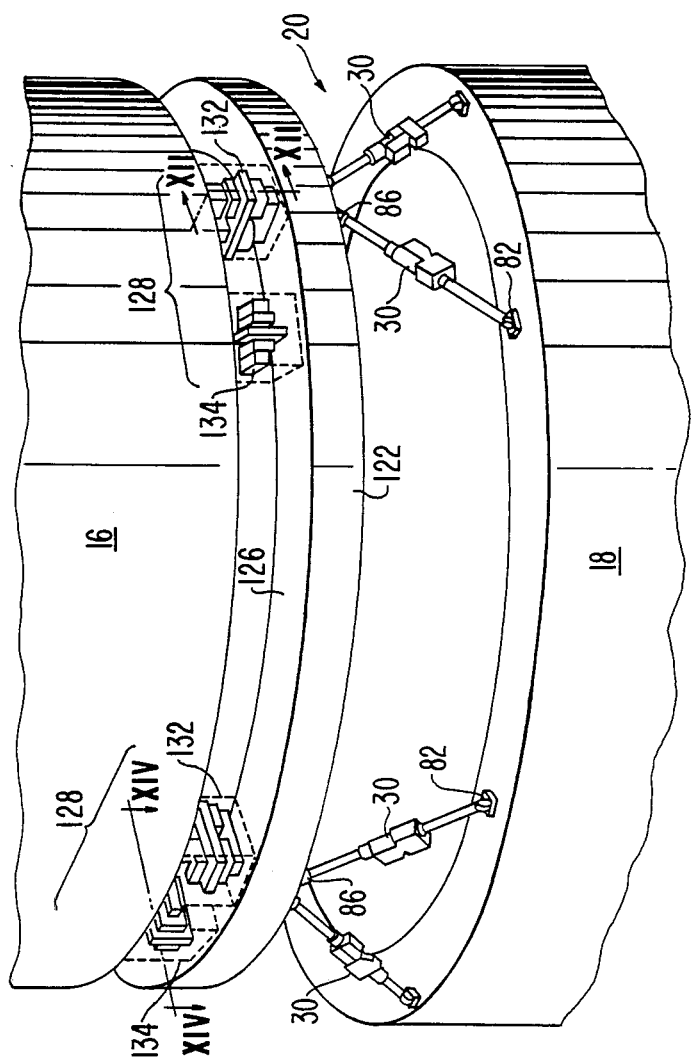
FIG. 11 is a partially schematic perspective view of a second embodiment the dual mode vibration isolator of this invention connected between two bodies to be isolated.

In a second embodiment of the present invention, shown generally in FIG. 11, the mounting member is a ring-shaped platform 122 and has magnetic actuators 128 arranged axially and tangentially with respect to its axis. Magnetic actuators 128 are evenly spaced along surface 126 of platform 122 to define three points of an equilateral triangle. Only two of the three pairs of magnetic actuators 128 are shown in FIG. 11. The third pair, which is hidden by the disclosed structure, is spaced from the two illustrated pairs by approximately 120° along the circumferential length of platform 122.

In accordance with the second embodiment of the invention, each pair of magnetic actuators preferably comprises an axial magnetic actuator 132 and a tangential magnetic actuator 134. With reference to FIGS. 12–15, which are schematic cross-sectional views of the magnetic actuators, each magnetic actuator 132, 134 includes a stator 136 and an armature magnetically suspended relative to the stator.

In the second embodiment of this invention, each stator 136 includes a frame member 138 for holding a pair of spaced-apart stator cores, generally designated 139 and 140. First stator core 139 includes a pair of poles 141 around which are wound field coils 142. Second stator core 140 includes a pair of magnet poles 144 around which are wound field coils 145. The two stator cores of axial magnetic actuators 132 are aligned axially with respect to platform 122, that is, along arrows AB of FIGS. 12 and 13. The two stator cores of tangential magnetic actuators 134 are aligned tangentially with respect to platform 122, that is, along arrows CD of FIGS. 14 and 15. Preferably, the stators of magnetic actuators 132, 134 are identical except for their mounting orientation.

Each axial magnetic actuator 132 includes an L-shaped armature 146, which is fixed to forward body 16. Armature 146 has a leg 147 extending from forward body 16 and a leg 148 formed of a magnetic material connected to leg 147 and extending substantially parallel to the surface of forward body 16. Preferably, leg 147 is formed of a non-magnetic material. As shown in FIG. 4, armature leg 148 is magnetically suspended in the space between the stator cores 139, 140 of axial magnetic actuator 132.

Each tangential magnetic actuator 134 includes an armature 149, formed of a magnetic material, that extends substantially perpendicularly from the surface of forward body 16 and is magnetically suspended between the stator cores 139, 140 of tangential magnetic actuator 134.

Figure 12:
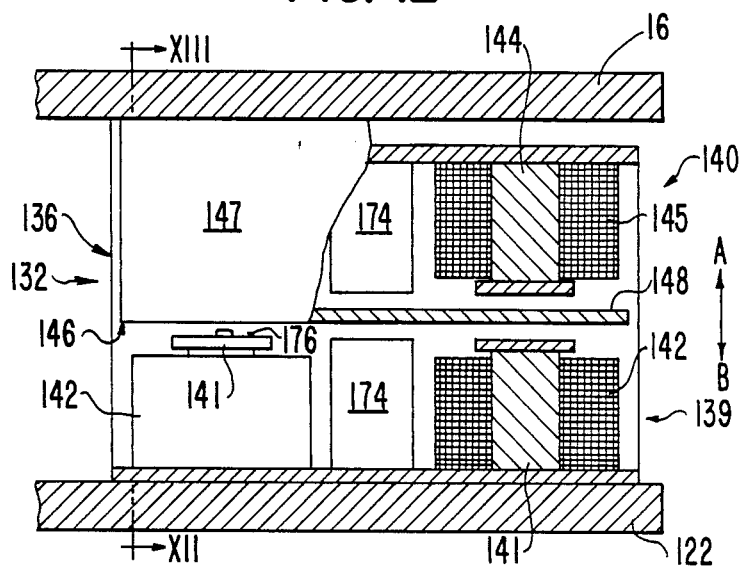
FIG. 12 is a schematic cross-sectional view of an axial magnetic actuator taken generally along line XII—XII of FIG. 11.
Figure 13:
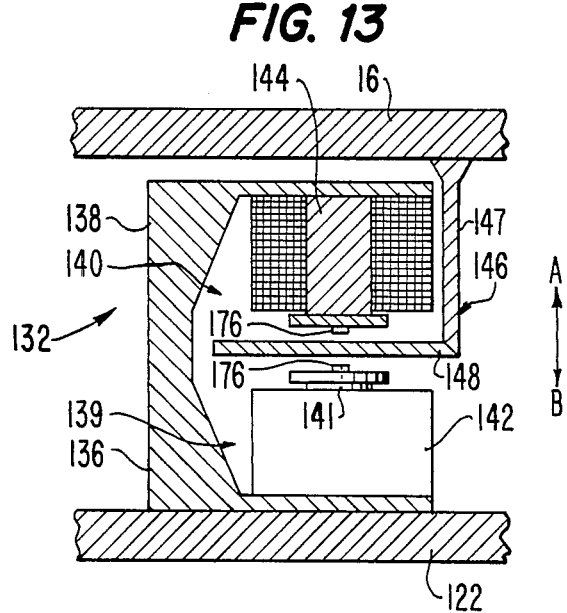
FIG. 13 is a schematic cross-sectional view of the axial magnetic actuator of FIG. 12 taken generally along line XIII—XIII.
Figure 14:
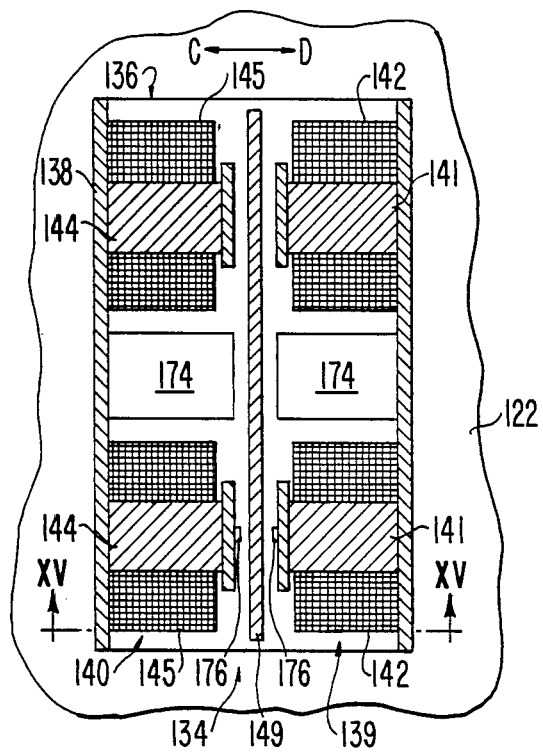
FIG. 14 is a schematic cross-sectional view of a tangential magnetic actuator taken along line XIV—XIV of FIG. 11.
Figure 15:
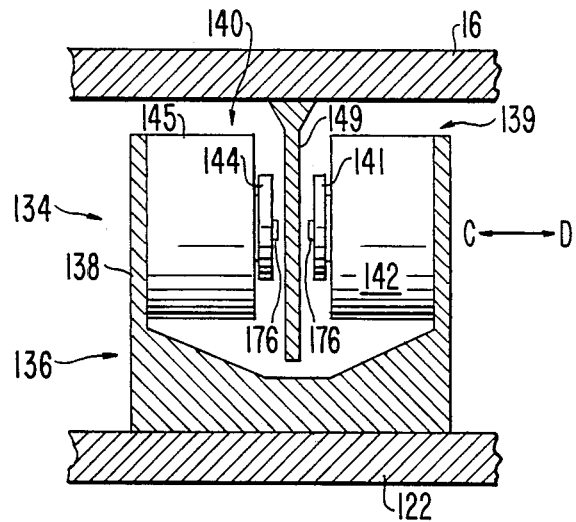
FIG. 15 is a schematic cross-sectional view of the tangential magnetic actuator of FIG. 14 taken along line XV—XV.

Gap sensors 174 are mounted on frame portions 138 of magnetic actuators 132 and 134 (see FIGS. 12 and 14). Gap sensors 174 preferably are inductive transducers. Flux sensors 176 are mounted on the faces of poles 141, 144.

The second embodiment of the invention uses the same control system as the first embodiment but requires different matrix transformations with respect to the magnetic actuator gap travel, as the stators of the second embodiment are in an axialtangential coordinate system. The difference in orientation of the magnetic actuators and linear actuators in the second embodiment results in the use of higher capacity magnetic actuators. Cross-axis coupling between magnetic actuators, however, is reduced in the second embodiment of the invention relative to the first embodiment. In the first embodiment, each magnetic actuator is closely coupled to the adjacent device mounted on the same mounting pad.

It will be apparent to those skilled in the art that modifications and variations can be made in the apparatus of this invention without departing from the scope or spirit of the invention. For example, means other than inductive transducers can be used as gap sensors, and the gap sensor can be used instead of flux sensor to control the magnetic actuators in the local magnetic actuator feedback loop. In addition, electrohydraulic linear actuators and other electro-mechanical linear actuators can be used in place of the brushless DC motor/roller screw linear actuators described herein. The invention in its broader aspects, therefore, is not limited to the specific details and illustrated examples shown and described. Accordingly, it is intended that the present invention cover such modifications and variations.

What is claimed is:

1. A dual mode vibration isolator for actively isolating vibrations between a first and a second body while permitting movement of the first body in six-degrees-of-freedom with respect to the second body, comprising:

a mounting member positioned between said first and second bodies to provide a stable mechanical interface between the bodies;

first, active isolating means mounted on said mounting member between said first body and said mounting member for reducing the transmission of vibrations between said first body and said mounting member;

second, active isolating means mounted on said mounting member between said second body and said mounting member for reducing the transmission of vibrations between said second body and said mounting member; and pivoting means, associated with both the first and second isolating means, for applying a torque to the first body so that the first body is able to pivot, upon activation of the pivoting means, in six-degrees-of-freedom with respect to the second body.

2. The apparatus of claim 1, wherein said first isolating means includes a plurality of magnetic actuators magnetically supporting said first body relative to said mounting member.

3. A dual mode vibration isolator for isolating vibrations between a first body and a second body, comprising:

a mounting member positioned between said first and second bodies;

first isolating means mounted on said mounting member between said first body and said mounting member for reducing the transmissin of vibrations between said first and said second bodies, wherein said first isolating means includes a plurality of magnetic actuators magnetically supporting said first body relative to said mounting member without physical contact; and second, active isolating means mounted on said mounting member between said second body and said mounting member for reducing the transmission of vibrations between said first and second bodies.

4. The isolator of claim 3, wherein said first isolating means includes means for detecting motion of said first body relative to said mounting member, and said isolator further comprises means responsive to said detecting means for controlling said first and second isolating means to move the mounting member in correlation to the detected motion of the first body.

5. The apparatus of claim 4, wherein said second isolating means includes a plurality of linear actuators each pivotally connected to said second body and said mounting member.

6. The apparatus of claim 4, wherein:

each of said magnetic actuators includes an armature magnetically suspended between a corresponding pair of stators; and said detecting means detects the position of each of said armatures relative to said corresponding pair of stators.

7. The apparatus of claim 3 wherein the mounting member includes three mounting pads equally spaced from each other to define vertices of an equilateral triangle, wherein the first isolating means includes three pairs of magnetic actuators, each of said pairs of magnetic actuators being mounted on one of said mounting pads, and wherein the second isolating means includes three pairs of linear actuators supporting said mounting member relative to said second body, each of said pairs of linear actuators being connected to one of said mounting pads.

8. The apparatus of claim 7 wherein each of said linear actuators has a longitudinal axis; each of said magnetic actuators has a pair of parallel magnetic axes and includes a pair of stator cores, each of said stator cores having a pair of magnetic coils wound about said magnetic axes; and said magnetic axes of each of said magnetic actuators are parallel with said longitudinal axis of one of said linear actuators mounted at a common one of said mounting pads.

9. The apparatus of claim 3 wherein each magnetic actuator has an armature fixed to said first body and a stator fixed to said mounting member, each of said stators including a pair of spaced-apart stator cores having wound thereon at least one magnetic coil generating oppositely directed magnetic fields therebetween and each of said armatures being suspended in a prescribed position between said stator cores of said corresponding stator by said magnetic fields, said magnetic support means also including gap sensor means for detecting variation of said armatures from said prescribed positions relative to said stator cores;

wherein the second isolating means include actuator means operative when activated to move said mounting member relative to said second body;

the apparatus further comprising system control means responsive to said gap sensor means for activating said actuator means to move said mounting member relative to said second body and restore said armatures to said prescribed positions relative to said stator cores; and local control means at each of said stators for adjusting said magnetic fields of said stator to permit said stator to vibrate relative to said corresponding armature without transmitting vibration to said corresponding armature.

10. The apparatus of claim 9, wherein each of said local control means includes flux sensor means for detecting a change in magnetic flux when said armature and said stator cores move relative to one another.

11. The apparatus of claim 10, wherein each of said local control means includes a flux feedback loop responsive to said flux sensor means, said flux feedback loop adjusting said magnetic fields of said stator to oppose said detected magnetic flux change.

12. The apparatus of claim 11, wherein said system control means includes a followup isolation loop responsive to said gap sensor means for restoring said mounting member to said prescribed position when said gap sensor means detects variations of said mounting member from said prescribed position.

13. The apparatus of claim 12, wherein said flux feedback loops operate at a first frequency and said followup isolation loop operates at a second frequency lower than said first frequency.

14. A dual mode vibration isolator for isolating vibrations between a first body and a second body, comprising:

a mounting member positioned between said first and second bodies;

magnetic isolating means mounted on said mounting member between said first body and said mounting for supporting the first body magnetically with respect to the mounting member without physical contact and for reducing the transmission of vibrations between said first body and said mounting member;

active means, mounted on said mounting member between said second body and said mounting member, for reducing the transmission of vibrations between said second body and said mounting member and for repositioning said mounting member and said first body in six-degrees-of-freedom relative to said second body.

15. The apparatus of claim 14, wherein said reducing-/repositioning means includes a plurality of linear actuators each pivotally connected to said second body and said mounting member, and further comprising motion detection means associated with the first body and the magnetic isolating means for detecting motion of the first body relative to the mounting member and a controller, connected to the motion detection means and responsive to the detection of motion of the first body, for commanding the linear actuators to move the mounting member in correlation to the detected motion.

16. The apparatus of claim 14, wherein the
mounting member provides a stable mechanical interface between the bodies and
reducing/repositioning means including a plurality of linear actuators supporting said mounting member relative to said second body, wherein the linear actuators include active means for moving the mounting member in six-degrees-of-freedom in correlation with motion of the first body to reduce contact between the first body and mounting member that might otherwise occur.

17. The apparatus of claim 16, wherein said reducing-/repositioning means including six linear actuators, each of said linear actuators having one end pivotally connected to said second body and another end pivotally connected to said mounting member.

18. The apparatus of claim 14 wherein the magnetic isolating means includes a plurality of magnetic actuators each having a corresponding armature fixed to said first body and a corresponding stator fixed to said mounting member, each of said stators including a pair of spaced-apart stator cores having wound thereon a pair of magnetic coils generating oppositely directed magnetic fields therebetween and each of said armatures being suspended between said stator cores of said corresponding stator by said magnetic fields, each of said magnetic actuators also including gap sensor means for detecting variation of said corresponding armature from a prescribed position between said stator cores of said corresponding stator; wherein the reducing/repositioning means includes a plurality of linear actuators each having one end pivotally connected to said second body and another end pivotally connected to said mounting member, each of said linear actuators including positioning means operative when activated to selectively vary the length of said individual linear actuator; and further comprising system control means responsive to said gap sensor means for activating said positioning means to adjust the lengths of said linear actuators to move said mounting member relative to said second body and to restore each of said armatures to said prescribed position.

19. The apparatus of claim 18 wherein said plurality of linear actuators includes a plurality of pairs of non-parallel linear actuators.

20. The apparatus of claim 18 wherein each of said linear actuators has a longitudinal axis; each of said magnetic coils of each of said stators is wound about a magnetic axis and said magnetic axes of said magnetic coils are located in a common plane; and said magnetic axes of each of said magnetic actuators are parallel with said longitudinal axis of one of said linear actuators.

21. The apparatus of claim 18 wherein said plurality of magnetic actuators includes a plurality of pairs of magnetic actuators, one of each pair of magnetic actuators having said stator cores aligned axially with respect to said mounting member and the other of each pair of magnetic actuators having said stator cores aligned tangentially with respect to said mounting member.

22. The apparatus of claim 18 further comprising:
local control means at each of said stators for adjusting said magnetic fields of said stator to permit said stator to vibrate relative to said corresponding armature without transmitting vibration to said corresponding armature.

23. The apparatus of claim 22 wherein each of said local control means includes flux sensor means for detecting a change in magnetic flux when said armature and said stator cores move relative to one another.

24. The apparatus of claim 23 wherein each of said local control means includes a flux feedback loop adjusting said magnetic fields of said stator to oppose said detected mangetic flux change.

25. The apparatus of claim 24 wherein said system control means includes a followup isolation loop responsive to said gap sensor means for restoring said mounting member to said prescribed position when said gap sensor means detects variations of said mounting member from said prescribed position.

26. The apparatus of claim 25 wherein said flux feedback loop operates at a first frequency and said followup isolation loop operates at a second frequency lower than said first frequency.

27. A dual mode vibration isolator for isolating vibration between a first body and a second body, comprising:
a mounting member positioned between said first and second bodies;
first isolating means mounted on said mounting member between said first body and said mounting member for reducing the transmission of vibrations between said first and second bodies, said first isolation means including a plurality of magnetic actuators magnetically supporting said first body relative to said mounting member; and
second isolating means mounted on said mounting member between said second body and said mounting member for reducing the transmission of vibrations between said first and second bodies and for repositioning said mounting member and said first body relative to said second body, said second isolation means including six linear actuators supporting said mounting member relative to said second body, each of said linear actuators having one end pivotally connected to said second body and another end pivotally connected to said mounting member, wherein the ends of said linear actuators that are connected to said mounting member lie in a single plane, and said second isolating means further includes means for varying the lengths of said linear actuators to pivot said mounting member and said first body about a pivot point lying in said plane through an arc.

28. The apparatus of claim 27, wherein each of said magnetic actuators includes an armature of a preselected thickness fixed to one of said first body or said mounting member and a stator fixed to the other of said first body or said mounting member, each of said stators including a pair of stator cores having opposed pole faces facing each other, each of said armatures being magnetically suspended between said opposed pole faces of said corresponding stator, said opposed pole faces of each of said stators being spaced apart by a preselected distance approximately 9.0 mm greater than said preselected thickness of said armature.

29. The apparatus of claim 28, wherein each of said stators generates a magnetic field exerting a force of up to about 3200 N on said corresponding armature when said second isolating means repositions said mounting member and said first body.

30. The apparatus of claim 27 wherein the linear actuators are grouped in three pairs with the ends of each linear actuator on the second body being spaced apart farther than the corresponding ends of each pair on the mounting member, and
   wherein the first isolating means includes (i) three pairs of magnetic actuators each having a corresponding armature fixed to said first body and a corresponding stator fixed to said mounting member, each of said stators including a pair of spaced-apart stator cores each having wound thereon a pair of magnetic coils generating oppositely directed magnetic fields therebetween and each of said armatures being suspended between said stator cores of said corresponding stator by said magnetic fields, one of each pair of magnetic actuators having said stator cores aligned axially with respect to said mounting member and the other of each pair of magnetic actuators having said stator cores aligned tangentially with respect to said mounting member each of said magnetic actuators and (ii) gap sensor means for detecting variation of said corresponding armature from a prescribed position between said stator cores of said corresponding stator, and
   further comprising system control means responsive to said gap sensor means for activating said varying means to adjust the lengths of said linear actuators to move said mounting member relative to said first body and to restore each of said armatures to said predetermined position between said stator cores of said corresponding stator.

31. A dual mode vibration isolator, comprising:
   a mounting member positioned between a first and a second body to provide a stable mechanical interface between the bodies;
   means for magnetically supporting without physical contact said first body relative to said mounting member, said magnetic support means including gap sensor means for detecting deviation of said mounting member from a prescribed null position relative to said first body by detecting a change in the gap of the magnetic support means;
   actuator means connected between said second body and said mounting member operative when activated to move said mounting member relative to said second body; and
   system control means responsive to said gap sensor means for activating said actuator means to restore said mounting member to said prescribed null position relative to said first body so that the mounting member chases the sensed motion of the first body.

32. The isolator of claim 31, wherein said actuator means includes a plurality of linear actuators each connected between said second body and said mounting member, each of said linear actuators including positioning means for selectively varying the length of said individual linear actuator when activated by said system control means.

33. A dual mode vibration isolator for reducing transmission of vibrations between a first body and a second body, comprising:
   a mounting member positioned between said first and second bodies;
   means for magnetically supporting said first body relative to said mounting member, said magnetic support means including gap sensor means for detecting variation of said mounting member from a prescribed position relative to said first body;
   actuator means connected between said second body and said mounting member operative when activated to move said mounting member relative to said second body, wherein said actuator means includes a plurality of linear actuators each connected between said second body and said mounting member, each of said linear actuators including positioning means for selectively varying the length of said individual linear actuator when activated by a system control means, and wherein each of said linear actuators includes one end pivotally connected to said second body and another end pivotally connected to said mounting member; and
   system control means responsive to said gap sensor means for activating said actuator means to return said mounting member to said prescribed position relative to said first body.

34. The apparatus of claim 33, wherein said ends of said linear actuators are connected to said second body and said mounting member by spherical bearings.

35. The apparatus of claim 33, wherein said magnetic support means includes a plurality of magnetic actuators each having an armature fixed to one of said first body or said mounting member and a stator fixed to the other of said first body or said mounting member, each of said stators including a pair of spaced-apart stator cores having wound thereon at least one magnetic coil generating oppositely directed magnetic fields therebetween and each of said armatures being suspended between said stator cores of said corresponding stator by said magnetic fields.

36. The apparatus of claim 35, wherein said gap sensor means includes an inductive transducer mounted on each of said stators.

37. A method for isolating vibration from transmission between two bodies, comprising the steps of:
   using magnetic actuators coupled between a mounting member and a first body to reduce transmission of small-amplitude vibrations between the member and first body, the magnetic actuators magnetically supporting the first body without physical contact with the mounting member; and
   using linear actuators coupled between a second body and the mounting member to reduce transmission of large-amplitude vibrations between the bodies by sensing movement of the mounting member relative to the first body and altering the length of the linear actuators to cause the mounting member to move in correlation to the sensed relative movement of the first body.

38. a method to isolating vibration from transmission between a first body and a second body, comprising the steps of:
   mechanically supporting a mounting member on the second body in a selectively variable position between the first body and the second body with active means for moving the mounting member in six-degrees-of-freedom relative to the second body;

magnetically supporting the first body relative to the mounting member without physical contact with the mounting member in a predetermined position spaced apart from the first body while allowing motion of the first body in six-degrees-of-freedom relative to the mounting member;

detecting movement of the mounting member relative to the first body; and moving the mounting member relative to the second body with the active moving means in response to detection of said movement of the mounting member to restore the mounting member to the predetermined position relative to the first body.

39. A dual mode vibration isolator for reducing transmission of vibrations between a first body and a second body, comprising:

a mounting member positioned between said first and second bodies;

means for magnetically supporting said first body relative to said mounting member, said magnetic support means including gap sensor means for detecting variation of said mounting member from a prescribed position relative to said first body, wherein said magnetic support means includes a plurality of magnetic actuators each having an armature fixed to one of said first body or said mounting member and a stator fixed to the other of said first body or said mounting member, each of said stators including a pair of spaced-apart stator cores having wound thereon at least one magnetic coil generating oppositely directed magnetic fields there between and each of said armatures being suspended between said stator cores of said corresponding stator by said magnetic fields;

actuator means connected between said second body and said mounting member operative when activated to move said mounting member relative to said second body; and system control means responsive to said gap sensor means for activating said actuator means to move said mounting member to said prescribed position relative to said first body.

40. The apparatus of claim 39 wherein said actuator means includes a plurality of linear actuators each connected between said second body and said mounting member, each of said linear actuators including positioning means for selectively varying the length of said individual linear actuator when activated by said system control means.

41. The apparatus of claim 40 wherein each of said linear actuators includes one end pivotally connected to said second body and another end pivotally connected to said mounting member.

42. The apparatus of claim 39, wherein said gap sensor means includes an inductive transducer mounted on each of said stators.

43. A dual mode vibration isolator for reducing transmission of vibrations between a first body and second body, comprising:

a mounting member positioned between said first and second bodies, said mounting members including three mounting pads equally spaced from one another and defining vertices of an equilateral triangle;

three pairs of linear actuators, each pair of linear actuators connecting said second body to one of said mounting pads of said mounting members, each of said linear actuators having one end pivotally connected to said second body and another end pivotally connected to said respective mounting pad, each of said linear actuators including a longitudinal axis passing between said ends and positioning means operative when activated to selectively vary the length of said individual linear actuator for moving said mounting member relative to said second body;

three pairs of magnetic actuators, each one of each pair of magnetic actuators having a corresponding armature fixed to said first body and a corresponding stator fixed to one of said mounting pads of said mounting member for mangnetically supporting said first body relative to said mounting member without physical contact, each of said stators including a pair of spaced-apart stator cores having wound thereon a pair of magnetic coils generating oppositely directed magnetic fields therebetween and each of said armatures being suspended between said stator cores of said corresponding stator by said magnetic fields, each of said magnetic coils being wound about a magnetic axis and said magnetic axes of each of said magnetic actuators being parallel and lying in a common plane, said magnetic axes of each of said magnetic actuators being parallel with said longitudinal axis of one of said linear actuators mounted at a common one of said mounting pads, each of said magnetic actuators also including gap sensor means for detecting variation of said armature from a prescribed position between said stator cores of said corresponding stator;

local control means for adjusting said magnetic fields of each of said stators to permit said stator to vibrate relative to said corresponding armature without transmitting vibration to said corresponding armature; and system control means responsive to said gap sensor means for activating said positioning means to adjust the lengths of said linear actuators to move said mounting member relative to said second body and to restore each of said armatures to said predetermined position between said stator cores of said corresponding stator.

44. The isolator of claim 43 wherein the mounting member is a triangular platform formed from three tubular connectors.

45. A method of controlling vibration isolation in a dual mode vibration isolator having a mounting member positioned between a first body and a second body, a plurality of magnetic actuators magnetically supporting the first body relative to the mounting member, and a plurality of linear actuators connecting the mounting member to the second body, wherein each of the magnetic actuators includes an armature magnetically supported between a pair of stator cores by opposed magnetic fields, the method comprising the steps of:

detecting changes in magnetic flux at each magnetic actuator;

adjusting the magnetic fields in each magnetic actuator in response to detected changes in magnetic flux to permit the stator cores of the respective magnetic actuator to move relative to the corresponding armature without causing the corresponding armature to move;

detecting relative positional variation of each of the armatures from a predetermined null position between the corresponding pair of stator cores; and adjusting the lengths of the linear actuators in response to detected positional variation of the armatures to move the mounting member and the stator cores to restore each of the armatures to the null position.

46. The method of claim 45, wherein said magnetic field adjusting step is performed periodically at a first frequency and said length adjusting step is performed periodically at a second frequency, said first frequency being higher than said second frequency.

47. The method of claim 46, further comprising adjusting the magnetic fields in each magnetic actuator periodically at a third frequency to position the first body with respect to the second body, said third frequency being lower than said second frequency.

48. A dual mode vibration isolator for reducing transmission of vibration from a first body to a second body while permitting dynamic repositioning of the first body relative to the second body in six degrees of freedom, comprising:

a mounting member having two opposed sides providing a stable mechanical interface between the first and second bodies;

means fixed to one side of the mounting member for supporting the first body relative to the mounting member without physical contact, the means defining at least one gap between the first body and the mounting member;

means fixed to the other side of the mounting member for connecting the mounting member compliantly to the second body, the connecting means including positioning means for actively moving the mounting member in six degrees of freedom relative to the second body;

means for detecting vibration of the first body relative to the mounting member; and system control means associated with the positioning means and responsive to the detecting means for moving the mounting member in six degrees of freedom in correlation to the detected vibration for maintaining the gap between the first body and the mounting member.

49. The isolator of claim 48 wherein the supporting means includes a plurality of magnetic actuators.

50. The isolator of claim 49 further comprising local controllers associated with each magnetic actuator for permitting vibration of a stator of the magnetic actuator relative to an armature without transmitting the vibration to the armature.

51. The isolator of claim 50 wherein each local controller includes flux sensors for detecting a change in magnetic flux in the magnetic actuator when the stator vibrates.

52. The isolator of claim 50 wherein the connecting means includes a plurality of pairs of linear actuators pivotally connected to both the mounting member and the second body.

53. The isolator of claim 52 wherein movement of the linear actuators for repositioning applies a torque between the first and second bodies of at least about 27,000N-m while transmission of vibration between the first and second body is reduced by about 80 dB over a frequency range from about 1–2000 Hz.

54. The isolator of claim 52 further comprising feedback control means associated with the system control means for providing feedback control to both the positioning means and local controllers to ensure that the mounting member moves in correlation with the relative motion of the first body.

55. A dual mode vibration isolator, comprising:

a mounting member having a top, a bottom, and a periphery, the member providing a mechanical interface between a first and a second body;

active isolating means connected between the first body and the top of the mounting member for isolating the first body from relative vibrations of the mounting member while permitting movement of the first body in six degrees of freedom relative to the mounting member;

active mechanical isolating means dispersed around the periphery of the bottom of the mounting member and connecting the mounting member to the second body, the active mechanical means reducing transmission of vibrations from the second body to the mounting member while permitting the relative motion of the mounting member with respect to the second body in six degrees of freedom; and motion sensing means for detecting relative motion between the first body and mounting member and for controlling both isolating means, as necessary, to avoid transmission of vibrations between the first and second bodies.

* * * * *